(12) United States Patent
Heimer

(10) Patent No.: US 8,876,449 B2
(45) Date of Patent: Nov. 4, 2014

(54) PLUG WITH FIXING ELEMENT AND SLEEVE

(75) Inventor: Dietmar Heimer, Mainz (DE)

(73) Assignee: Brunson Instrument Company, Kansas City, MO (US)

( * ) Notice: Subject to any disclaimer, the term of this patent is extended or adjusted under 35 U.S.C. 154(b) by 693 days.

(21) Appl. No.: 12/988,782

(22) PCT Filed: Apr. 23, 2009

(86) PCT No.: PCT/EP2009/002966
§ 371 (c)(1),
(2), (4) Date: Dec. 21, 2010

(87) PCT Pub. No.: WO2009/130027
PCT Pub. Date: Oct. 29, 2009

(65) Prior Publication Data
US 2011/0110743 A1    May 12, 2011

(30) Foreign Application Priority Data

Apr. 23, 2008  (EP) ..................... 08007880

(51) Int. Cl.
*F16B 13/06* (2006.01)
(52) U.S. Cl.
USPC .......................................... 411/57.1; 411/44

(58) Field of Classification Search
USPC ............ 411/57.1, 54.1, 35, 37, 34, 44, 71, 72
See application file for complete search history.

(56) References Cited

U.S. PATENT DOCUMENTS

| | | | | |
|---|---|---|---|---|
| 688,756 A | * | 12/1901 | Tripp | 411/50 |
| 688,758 A | * | 12/1901 | Tripp | 114/178 |
| 777,399 A | * | 12/1904 | Church | 411/55 |
| 3,605,548 A | * | 9/1971 | Mortensen | 411/44 |
| 4,371,300 A | * | 2/1983 | Ringham | 411/41 |
| 4,861,198 A | * | 8/1989 | Stankus | 405/259.3 |
| 4,884,931 A | * | 12/1989 | Revol et al. | 411/60.1 |

FOREIGN PATENT DOCUMENTS

| | | |
|---|---|---|
| CH | 325754 A | 11/1957 |
| DE | 2548495 A1 | 5/1976 |
| DE | 10339147 A1 | 3/2005 |
| DE | 10353237 A1 | 7/2005 |
| FR | 2289789 A1 | 5/1976 |
| FR | 2657402 A1 | 7/1991 |
| GB | 1286660 A | 8/1972 |

* cited by examiner

*Primary Examiner* — Gary Estremsky
(74) *Attorney, Agent, or Firm* — Christensen O'Connor Johnson Kindness PLLC

(57) ABSTRACT

The invention relates to a fixing device for anchoring in a building material, comprising a fixing element with an axial conical anchoring region and a fixing region and a radially flexible clamping sleeve which may be clamped between the anchoring region and the building material. The invention further relates to a method for anchoring the fixing device.

20 Claims, 4 Drawing Sheets

_US 8,876,449 B2_

PLUG WITH FIXING ELEMENT AND SLEEVE

FIELD OF THE INVENTION

The invention relates to a fixing device for anchoring in a building material as well as a method for anchoring the fixing device.

BACKGROUND OF THE INVENTION

Commercially available plugs in very diverse variations, made of plastics or metal, with or without sleeve, have some disadvantages. The plastic plugs have a relatively wide range of pull-out values and here depend much, among other things, on the tolerances of the diameter of the fixing hole and on the size, and possibly also on the penetration depth of the selected fixing screw. Under unfavorable conditions, the minimum toughness can considerably drop.

Furthermore, plug-like devices for fixing objects at brickworks are known which are provided in particular for retaining external cladding and the like. It comprises a long stretched-out, tubular, longitudinally slotted sleeve as well as a fixing screw for the same. After the fixing screw has been tightened, an annular fixing zone comparably narrow in the axial direction forms at the inner end of the long stretched-out expanding sleeve.

The time required for the screwing-in operation is very long in particular as of a diameter of about 10 mm as a relatively large number of rotations must be performed at the fixing screw.

BRIEF SUMMARY OF THE INVENTION

In view of the disadvantages of prior art, the object underlying the invention is to provide a fixing device or a plug, respectively, which overcomes the above-mentioned disadvantages and in particular permits a quick and stable anchoring of the fixing device.

The mentioned object is achieved by a fixing device according to the invention for anchoring in a building material, having a fixing element comprising an axial conical anchoring region and a fixing region, and a radially flexible clamping sleeve which may be clamped between the anchoring region and the building material.

The fixing device according to the invention accordingly comprises a fixing element which comprises an anchoring region which is embodied rotationally symmetrically about its longitudinal axis with a conical shape, that means with the shape of a frustum. The fixing element furthermore comprises a fixing region which is arranged at the end of the conical anchoring region where the frustum has the smallest diameter. The fixing element with anchoring region and fixing region can be integrally formed or else embodied in several pieces.

Furthermore, the fixing device according to the invention comprises a radially flexible clamping sleeve which can be clamped between the anchoring region of the fixing element and the building material in which the fixing device is to be anchored.

This clamping is effected by inserting the fixing element with the larger diameter of the conical anchoring region first into a recess—for example a drilled hole—of the building material and thereupon introducing and clamping the clamping sleeve between the conical anchoring region of the fixing element and the building material. In the process, e.g. the conical anchoring region can expand the radially flexible clamping sleeve such that the outer surface of the clamping sleeve is connected with the building material in a force-fitting manner.

An object to be fixed can be fixed at the fixing region. For example, the fixing device can be anchored in a concrete floor, and the fixing element can be embodied as seat for a retroreflector, whereby a fixed point for optical measurement with laser trackers is defined with 3D coordinate measuring technology.

On the other hand, however, the fixing device according to the invention can also be anchored in a ceiling or in a wall, and the fixing region can comprise, for example, a thread to which the element to be fixed can be screwed.

The fixing device according to the invention can be further embodied such that the dimensioning of the anchoring region and the clamping sleeve are matched such that the clamping sleeve can be radially expanded through the anchoring region for clamping.

The geometric design of the conical anchoring region with respect to the diameter and cone angle and the diameter of the clamping sleeve are matched, and they are themselves also matched to the size of a drilled hole in the building material, so that the clamping sleeve, when it is driven into the drilled hole, slides over the conical anchoring region expanding to the inside and is radially expanded thereby until a force-fit contact to the building material is created.

As an alternative to this, the dimensioning of the anchoring region and the clamping sleeve as well as of the drilled hole can also be matched such that the clamping sleeve is radially compressed by the building material when it is driven into the drilled hole, and the clamping sleeve is driven forward until it comes into contact with the conical anchoring region and in the process is again pressed against the wall of the drilled hole until a force-fit clamping with the building material has been created.

Another further development of the fixing device according to the invention is that the inner surface of the clamping sleeve can be brought into flat contact with the outer surface of the conical anchoring region. This has the advantage that the force-fit clamping is effected over the surface, whereby a reliable anchoring of the fixing element is achieved.

Another further development of the fixing device according to the invention is that the inner surface of the clamping sleeve can have a conical design, preferably at an angle which corresponds to that of the conical anchoring region. In this manner, a large contact surface between the conical anchoring region and the conically embodied inner surface of the clamping sleeve results, whereby uniform clamping with the building material can be achieved.

Another further development of the fixing device according to the invention is that the clamping sleeve can comprise a longitudinal slot - that means a slot in the axial direction. In this manner, a clamping sleeve which is radially flexible can be provided in a simple manner, in particular if the clamping sleeve consists of a metallic material.

Another further development of the fixing device according to the invention is that the material of the clamping sleeve can comprise plastics, in particular rigid PVC, or metal, in particular brass. If the clamping sleeve consists of plastics, the fixing element can be used in hard materials as well as in soft materials, such as e.g. gas or porous concrete. If the clamping sleeve consists of metal, a very stable anchoring in the building material is achieved.

Another further development of the fixing device according to the invention is that the fixing region can comprise a thread, in particular a threaded bolt, and/or a spherical cap, in particular a calotte shell, and/or a hook and/or an eye and/or a magnet and/or a bayonet and/or an adherend. If the fixing region comprises a thread, e.g. an elongation piece with a separate seat for a retroreflector can be screwed on to adapt inaccessible floor points with the elongation piece and thus make it accessible for a laser tracker.

Another further development of the fixing device according to the invention is that the fixing element can comprise metal, preferably machining steel. In this manner, the fixing element is designed to be stable.

Another further development of the fixing device according to the invention is that the conical anchoring region can taper towards the fixing region. In this manner, the fixing region can point to the open side of a non-continuous drilled hole of a building material.

As an alternative to this, e.g. for the use in through holes, the fixing region can be arranged at the end of the cone which has the largest diameter, so that for example in a through hole in a wall, the clamping sleeve is driven in from one side, while the fixing region is arranged on the other side of the wall.

Another further development of the fixing device according to the invention is that it can comprise a cover for covering the fixing element. It can be ensured thereby that in fixing devices which are suited for receiving various bodies which can be regularly exchanged, in particular that the fixing region of the fixing element is not damaged during the exchange. Particularly preferred, the cover can be designed such that it can be completely submerged, sealed in a watertight manner and screwed onto the fixing element.

Another further development of the aforementioned further development is that the cover can be screwed onto a thread of the fixing element, preferably such that the cover is flat and flush with a surface of the building material. Thereby, a flat surface can be obtained in particular for anchoring in the floor region with a cover when the fixing device is not used.

Another further development of the fixing device according to the invention is that the clamping sleeve comprises conical barbs at its outer surface. In this manner, a good connection with the building material can be achieved, in particular, high pull-out values can be achieved thereby.

The above mentioned object is also achieved by the method according to the invention for anchoring a fixing device according to the invention in a building material, comprising the following steps: introducing the fixing element into an anchoring hole, in particular into a drilled hole, in the building material, the conical anchoring region tapering towards the open side of the anchoring hole, and clamping the clamping sleeve between the anchoring region and the building material. The advantages of this method correspond to the advantages already mentioned with reference to the fixing device.

The method according to the invention can be further developed by the clamping of the clamping sleeve being effected by an instantaneous application of force onto the clamping sleeve, in particular by hitting in the axial direction onto a drive-in adapter mounted on the clamping sleeve, whereby the clamping sleeve slides over the axial conical anchoring region and the latter radially expands the clamping sleeve and clamps it between the anchoring region and the building material.

The various further developments can be employed independent of each other or combined with each other.

Further preferred embodiments of the invention will be described below with reference to the drawings.

DETAILED DESCRIPTION OF THE INVENTION

Figure 1A:
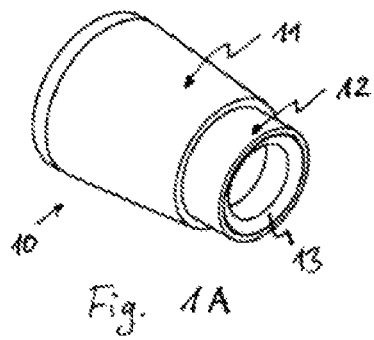
FIGS. 1A-1D show various views of the fixing element of the fixing device according to the invention.
Figure 1B:
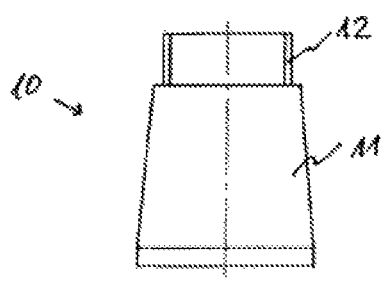
Figure 1D:
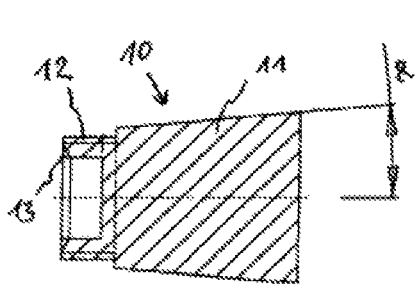
Figure 1C:
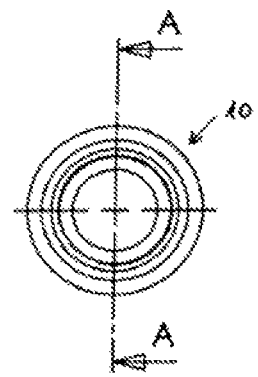
Figure 2B:
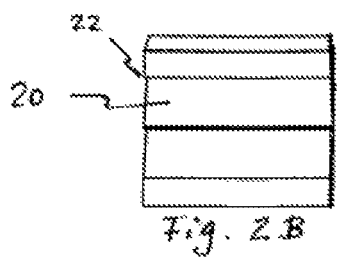
FIGS. 2A-2D show various views of the clamping sleeve of the fixing device according to the invention.
Figure 2D:
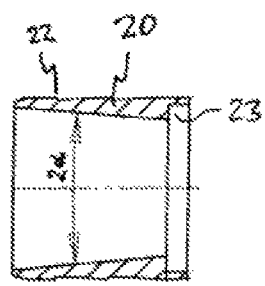
Figure 2C:
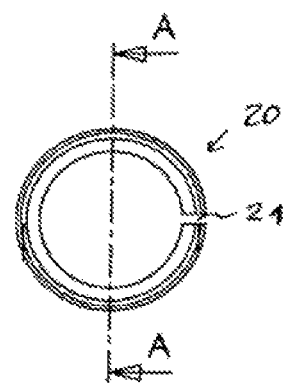
Figure 2A:
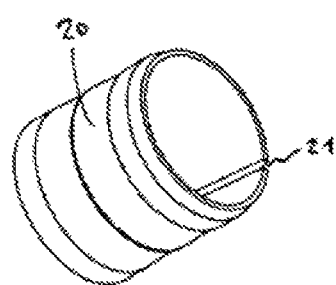
Figure 3B:
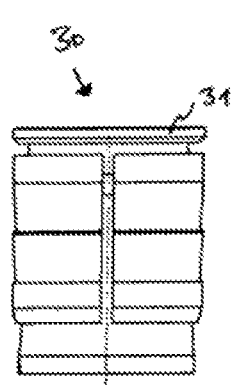
FIGS. 3A-3D show various views of the complete fixing device according to the invention.
Figure 3D:
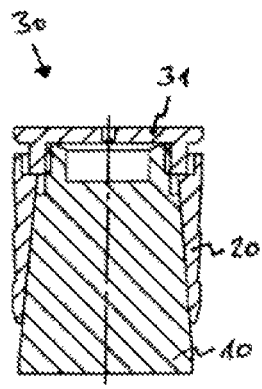
Figure 3C:
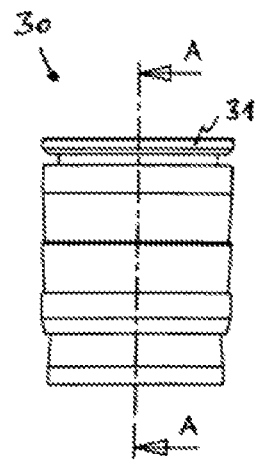
Figure 3A:
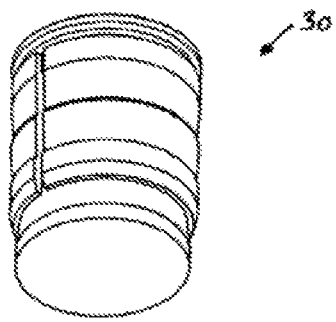

FIGS. 1A to 1D show various views of the fixing element 10 of the fixing device according to the invention. The fixing element 10 comprises an axial conical anchoring region 11 and a fixing region 12. The opening angle of the conical region is designated with α. The fixing region 12 comprises a thread at its outer surface onto which a cover cap can be screwed.

Furthermore, the fixing region comprises a support section 13 onto which a reflector ball can be placed, e.g. fixed by a (non-depicted) magnet when the fixing element is arranged in a floor hole. This arrangement is such that the end of the conical region with the larger diameter points downwards in the floor hole.

FIGS. 2A to 2D show various views of the clamping sleeve 20 of the fixing device according to the invention. The clamping sleeve 20 has a conical design on its inner surface such that the opening angle corresponds to that of the conical anchoring region 11 of the fixing element 10 according to FIG. 1. Furthermore, the clamping sleeve 20 comprises a longitudinal slot 21. The outer surface of the clamping sleeve 20 is moreover provided with conical barbs 22 which can interlock with uneven areas of the building material.

FIGS. 3A to 3D show various views of the complete fixing device 30 according to the invention. The complete fixing device 30 here consists of the fixing element 10, the clamping sleeve 20 as well as a cover 31.

Figure 4:
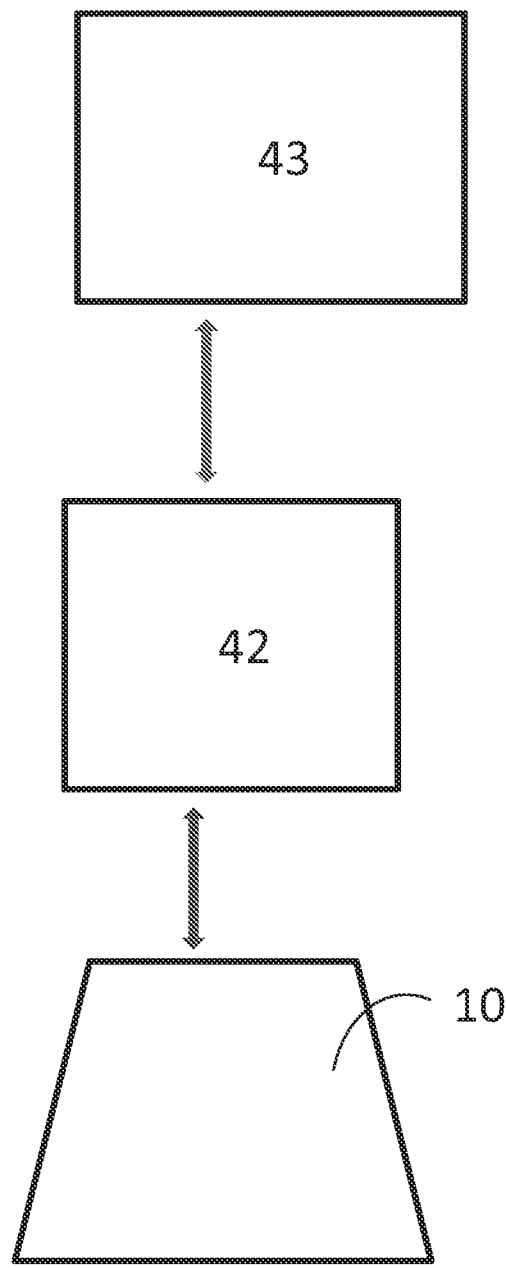
FIG. 4 shows a schematic view of a fixing device according to the invention.

FIG. 4 shows a schematic view of a fixing device according to the invention, which comprises a fixing element 10, a fixing region 42 and a cover 43. The fixing region 42 can comprise a thread, in particular a threaded bolt, and/or a spherical cap, in particular a calotte shell, and/or a hook and/or an eye and/or a magnet and/or a bayonet and/or an adherend. If the fixing region 42 comprises a thread, e.g. an elongation piece with a separate seat for a retroreflector can be screwed on to adapt inaccessible floor points with the elongation piece and thus make it accessible for a laser tracker.

The procedure for anchoring the fixing device is as follows. First, a hole is drilled or broken out in the building material, for example a concrete floor. The diameter of the drilled hole is only slightly larger than the largest diameter of the conical anchoring region 11 of the fixing element 10. The fixing element 10 is then inserted into the drilled hole and its height is made level e.g. with sand. Subsequently, the clamping sleeve 20 is placed onto the conical anchoring region 11 and clamped between the anchoring region 11 and the building material with a drive-in adapter placed onto the inner edge 23 by an impact in the axial direction. In the process, the clamping sleeve 20 expands in the axial direction due to the slot 21, such that a force-fit connection between the conical anchoring region 11 of the fixing element 10 of the clamping sleeve 20 and the building material is formed.

Preferred embodiments of the fixing means will be summarized again below.

If required, the plug is at least partially, preferably completely, made of plastics so that it can be used in a hard material, such as concrete, as well as in a softer material, such as gas or porous concrete.

One important object of the invention is to design the plug such that it is equally suited for various fields of application if possible, e.g. for attaching so-called anchors, or as submersible mounting for retroreflectors as they are employed in optical 3D metrology, for example, as fixed points in the measurement of particle accelerators. For this, the fixing element is provided with an external thread as well as with a calotte shell.

The plug is anchored in the drilled hole by the conical sleeve being uniformly expanded in the radial direction by the conical fixing element with a drive-in adapter by an impact in the axial direction. The sleeve comprises conical barbs which ensure that extremely high pull-out values are achieved.

As the plug is suited for receiving many different bodies which can change regularly, it must be ensured that the reflector seat/thread of the fixing element is not damaged. According to the invention, this is realized by a fully submersible, watertightly sealing cover which is screwed onto the fixing element.

The invention claimed is:

1. Fixing device to be anchored in a building material, having
    a fixing element comprising an axial conical anchoring region and a fixing region, and
    a radially flexible clamping sleeve which can be clamped between the anchoring region and the building material,
    wherein the fixing region comprises one of a threaded bolt, a calotte shell, a hook, an eye, a magnet, a bayonet, and an adherend, and
    furthermore comprising a cover for covering the fixing element.

2. Fixing device according to claim 1, wherein the dimensioning of the anchoring region and the clamping sleeve are matched such that the clamping sleeve can be radially expanded through the anchoring region for clamping.

3. Fixing device according to claim 1, wherein the inner surface of the clamping sleeve can be brought into flat contact with the outer surface of the conical anchoring region.

4. Fixing device according to claim 1, wherein the inner surface of the clamping sleeve has a conical design, preferably with an angle which corresponds to that of the conical anchoring region.

5. Fixing device according to claim 1, wherein the clamping sleeve comprises a longitudinal slot.

6. Fixing device according to claim 1, wherein the material of the clamping sleeve comprises plastics or metal.

7. Fixing device according to claim 1, wherein the fixing element comprises metal.

8. Fixing device according to claim 6, wherein the material of the clamping sleeve comprises rigid PVC.

9. Fixing device according to claim 6, wherein the material of the clamping sleeve comprises brass.

10. Fixing device according to claim 7, wherein the fixing element comprises machining steel.

11. Fixing device according to claim 1, wherein the conical anchoring region tapers towards the fixing region.

12. Fixing device according to claim 1, wherein the cover can be screwed onto a thread of the fixing element.

13. Fixing device according to claim 12, wherein the cover can be screwed onto a thread of the fixing element such that the cover is flush with a surface of the building material when the fixing device is anchored in the building material.

14. Fixing device according to claim 1, wherein the clamping sleeve and its outer surface comprises conical barbs.

15. Method for anchoring a fixing device in a building material,
    wherein the fixing device includes
        a fixing element comprising an axial conical anchoring region and a fixing region, and
        a radially flexible clamping sleeve which can be clamped between the anchoring region and the building material,
        wherein the fixing region comprises one of a threaded bolt, a calotte shell, a hook, an eye, a magnet, a bayonet, and an adherend, and
        a cover for covering the fixing element,
    the method comprising the following steps:
        introducing the fixing element into an anchoring hole in the building material, the conical anchoring region tapering towards the open side of the anchoring hole, and
        clamping the clamping sleeve between the anchoring region and the building material.

16. Method according to claim 15, wherein the dimensioning of the anchoring region and the damping sleeve are matched, the method further comprising such radially expanding the clamping sleeve through the anchoring region for clamping.

17. Method according to claim 15, further comprising bringing the inner surface of the clamping sleeve into flat contact with the outer surface of the conical anchoring region.

18. Method for anchoring a fixing device in a building material,
    wherein the fixing device includes
        a fixing element comprising an axial conical anchoring region and a fixing region, and
        a radially flexible clamping sleeve which can be clamped between the anchoring region and the building material,
        wherein the fixing region comprises one of a threaded bolt, a calotte shell, a hook, an eye, a magnet, a bayonet, and an adherend,
        a cover for covering the fixing element,
    the method comprising the following steps:
        introducing the fixing element into an anchoring hole in the building material, the conical anchoring region tapering towards the open side of the anchoring hole, and
        clamping the clamping sleeve between the anchoring region and the building material,
        wherein the clamping of the clamping sleeve is effected by an instantaneous application of force onto the clamping sleeve, in particular by hitting in the axial direction onto a drive-in adapter mounted on the clamping sleeve, whereby the clamping sleeve slides over the axial conical anchoring region and the latter radially expands the clamping sleeve and clamps it between the anchoring region and the building material.

19. Method according to claim 15, wherein the inner surface of the clamping sleeve has a conical design, preferably with an angle which corresponds to that of the conical anchoring region.

20. Method according to claim 15, wherein the conical anchoring region tapers towards the fixing region.

* * * * *